United States Patent
Wheat et al.

(10) Patent No.: US 8,354,081 B2
(45) Date of Patent: *Jan. 15, 2013

(54) PORTABLE FUEL PROCESSOR APPARATUS AND ENCLOSURE AND METHOD OF INSTALLING SAME

(75) Inventors: William Spencer Wheat, Missouri City, TX (US); James F. Stevens, Katy, TX (US); Curtis L. Krause, Houston, TX (US); Jeffrey A. Hedges, Fulshear, TX (US); Eric G. Pow, Vancouver (CA)

(73) Assignee: Texaco, Inc., San Ramon, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 10/407,316

(22) Filed: Apr. 4, 2003

(65) Prior Publication Data
US 2004/0194381 A1 Oct. 7, 2004

(51) Int. Cl.
*B01J 8/00* (2006.01)
(52) U.S. Cl. ....... 422/625; 422/112; 422/198; 48/197 R; 48/127.7; 48/118.5
(58) Field of Classification Search .................... 429/12, 429/13, 17, 22; 48/197 R, 127.7, 118.5; 422/112, 190, 108, 105, 625, 198; 60/39.3, 60/805
See application file for complete search history.

(56) References Cited

U.S. PATENT DOCUMENTS

| 5,733,675 | A | * | 3/1998 | Dederer et al. | 429/19 |
| 5,985,474 | A | | 11/1999 | Chen | |
| 6,080,500 | A | * | 6/2000 | Fuju et al. | 429/12 |

(Continued)

FOREIGN PATENT DOCUMENTS

CA 2274254 4/1998
(Continued)

OTHER PUBLICATIONS

Ishizawa, M., et al., "Portable Fuel-Cell Systems," NTT Review, vol. 9, No. 5, pp. 65-69 (Sep. 1997) XP000704773.

(Continued)

*Primary Examiner* — Nina Bhat
(74) *Attorney, Agent, or Firm* — Frank C. Turner; Melissa Patangia; Christopher D. Northcutt

(57) ABSTRACT

A portable fuel processing apparatus and enclosure including an enclosure having an outer wall that defines an interior space and provides a gas impermeable barrier. Attached to the enclosure is porting means for use in moving the enclosure from one location to another. A fuel reformer capable of providing sufficient hydrogen-rich reformate to a fuel cell stack for use in generating at least about 1 kW per hour is disposed within the enclosure. An optional gas detection system includes a sensor disposed within the enclosure to monitor the interior of the enclosure for presence of combustible gases. The portable apparatus can have a number of connectors for connecting the enclosure and the fuel processing systems to a source of a reformer fuel and water as well as a domestic drain. Preferred sources of fuel and water are common utility lines available in buildings. Additional connectors can be provided to couple the fuel processor with a fuel cell, for used in delivering a reformate stream, air stream and circulating cooling medium to a fuel cell and for returning a fuel cell exhaust stream to the enclosure. Moreover, the portable fuel processing apparatus and enclosure can further include connectors for establishing electronic communications with a remote process control unit. A method of installing the portable fuel processing apparatus is also provided.

22 Claims, 1 Drawing Sheet

U.S. PATENT DOCUMENTS

| | | | |
|---|---|---|---|
| 6,107,691 A * | 8/2000 | Gore et al. ............... 290/1 R |
| 6,183,895 B1 | 2/2001 | Kudo et al. |
| 6,232,005 B1 | 5/2001 | Pettit |
| 6,268,077 B1 * | 7/2001 | Kelley et al. ............... 429/33 |
| 6,322,920 B1 | 11/2001 | Tomson |
| 6,429,019 B1 * | 8/2002 | Goldstein et al. ............ 436/134 |
| 6,653,005 B1 * | 11/2003 | Muradov ............... 429/19 |
| 6,653,749 B2 | 11/2003 | Delbridge |
| 2002/0080636 A1 | 6/2002 | Delbridge |
| 2002/0114983 A1 * | 8/2002 | Frank et al. ............... 429/9 |
| 2002/0119354 A1 | 8/2002 | O'Brien et al. |
| 2003/0044663 A1 | 3/2003 | Ballantine et al. |
| 2004/0197611 A1 * | 10/2004 | Niedzwiecki et al. ......... 429/13 |

FOREIGN PATENT DOCUMENTS

| | | |
|---|---|---|
| EP | 0957063 | 11/1999 |
| JP | 992318 | 9/1976 |
| JP | 4160002 | 6/1992 |
| JP | 44798 | 7/1993 |
| JP | 8241723 | 9/1996 |
| JP | 9171842 | 6/1997 |
| JP | 11102717 | 4/1999 |
| JP | 11278807 | 10/1999 |
| JP | 2002056864 | 2/2002 |
| JP | 2002175827 | 6/2002 |
| JP | 2002203584 | 7/2002 |
| WO | WO 01/59861 A2 | 8/2001 |
| WO | WO02103831 | 12/2002 |

OTHER PUBLICATIONS

Ishizawa, M., et al.: "Portable Fuel Cell System for Telecommunications Use" Chemical Abstracts, vol. 125, No. 5 (Jul. 8, 1996), Abstract No. 15128, XP000666114.

Search Report ROC (Taiwan) Patent Application No. 093109295 dated Apr. 6, 2010, 1 page.

* cited by examiner

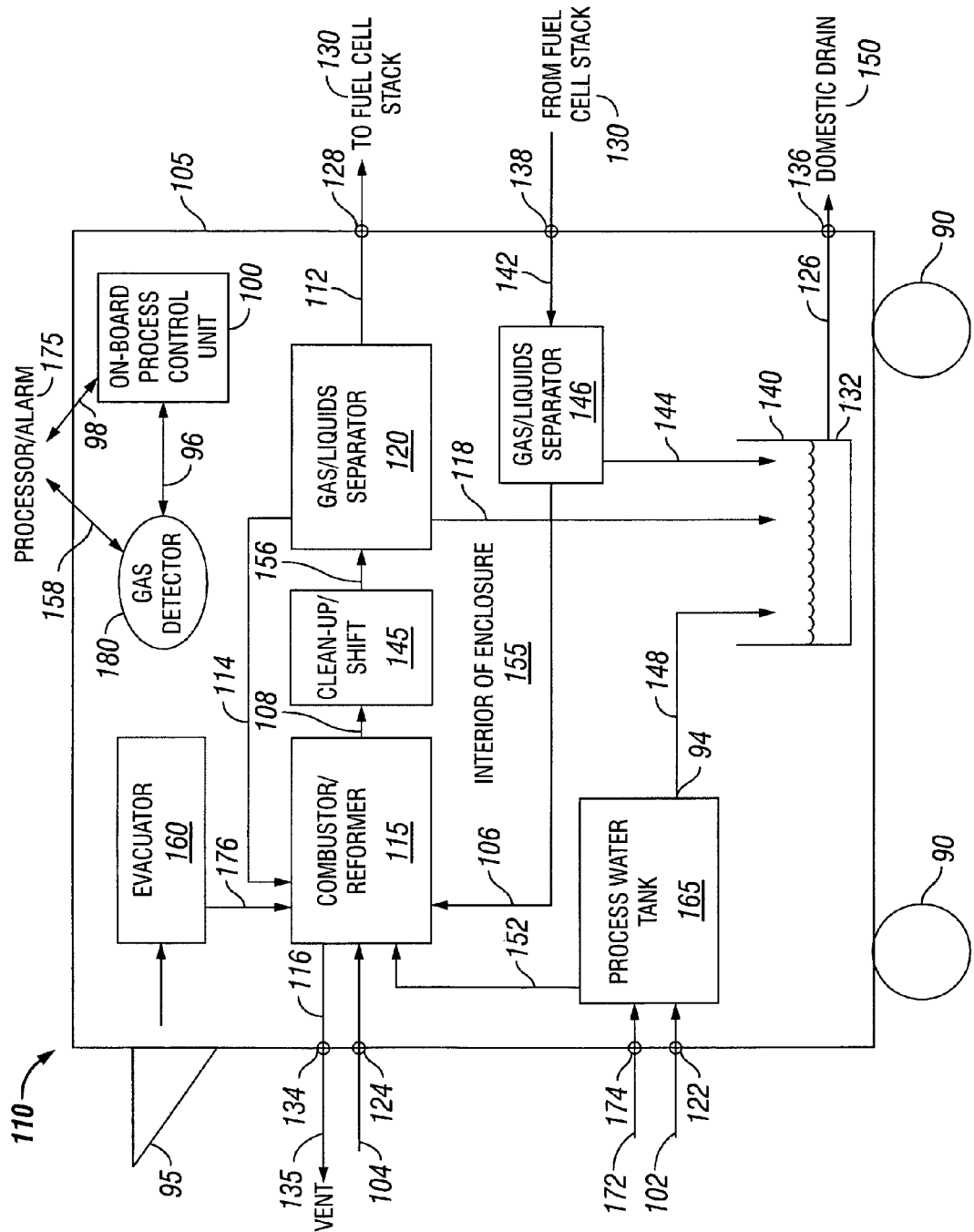

PORTABLE FUEL PROCESSOR APPARATUS AND ENCLOSURE AND METHOD OF INSTALLING SAME

FIELD OF THE INVENTION

The present invention relates to fuel processing apparatus for converting hydrocarbon-based fuels into a hydrogen-enriched reformate for use by fuel cells or other devices requiring hydrogen-rich feed streams. The apparatus and methods of the present invention provide a portable fuel processing apparatus that may be easily transported and installed at a desired location.

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of reformers to convert a hydrocarbon fuel to a hydrogen rich gas stream that can be used as a feed for fuel cells.

Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming (SR), autothermal reforming (ATR), catalytic partial oxidation (CPOX), or non-catalytic partial oxidation (POX). The clean-up processes are usually comprised of a combination of desulphurization, high temperature water-gas shift, low temperature water-gas shift, selective CO oxidation, or selective CO methanation. Alternative processes for recovering a purified hydrogen-rich reformate include the use of hydrogen selective membrane reactors and filters.

In addition, there is growing demand for fuel cell and fuel processing systems that are able to deliver higher power outputs with greater flexibility. Portability is a feature that brings greater flexibility, but it is typically accompanied by much smaller power outputs and limited operational times. Thus, there is a need for fuel processors that are easily portable and that can reliably provide larger quantities of fuel cell quality reformate for extended periods of operation.

SUMMARY OF THE INVENTION

The present invention provides a portable fuel processing apparatus. The apparatus includes an enclosure having an outer wall that defines an interior space and provides a gas impermeable barrier. Attached to the enclosure is porting means for use in moving the enclosure from one location to another. Preferably, the porting means include wheels, rollers, tracks and the like affixed to a bottom surface of the enclosure. In addition, porting means can include handles, grips and other features attached to one or more side surfaces of the enclosure. The apparatus further includes a fuel reformer located within the enclosure for converting a reformer fuel to fuel cell quality hydrogen-rich reformate gas. The fuel reformer is capable of providing sufficient hydrogen-rich reformate to a fuel cell stack for use in generating at least about 1 kW, more preferably at least about 3 kW, and still more preferably at least about 7.5 kW of electricity. An optional, but highly preferred, feature of the enclosure of the present invention is a gas detection system that includes a sensor disposed within the enclosure to monitor the interior of the enclosure for presence of combustible gases.

In addition, the portable fuel processing apparatus can have a number of optional, but highly preferred connectors. Such connectors can include a connector for connecting the enclosure and the fuel reformer to a source of a reformer fuel such as a gas utility line within a building. Similarly, the enclosure can have a connector for connecting the enclosure with a source of water that is preferably a water utility line. Further, the enclosure can have a connector or outlet for connecting with an external drain. Optionally, the enclosure can also have connectors for connecting the fuel processor with a fuel cell (or fuel cell stack) for delivering a hydrogen-rich reformate stream to the fuel cell and for returning a fuel cell exhaust stream to the enclosure. Moreover, the portable fuel processing apparatus can further include connectors for establishing electronic communications with a remote process control unit.

In a process aspect, the present invention provides a method of installing a fuel processor. The method includes the steps of moving a portable gas impermeable enclosure housing a fuel processor to a desired location, connecting a source of water to the enclosure, connecting a source of reformer fuel to the enclosure, and connecting a fuel cell to the enclosure. Preferably, the steps of connecting the enclosure to a source of water and to a source of reformer fuel include connecting the enclosure to water and natural gas utility lines within a building. The method can further include the step of providing or connecting a domestic drain to the enclosure. The step of connecting the enclosure to a fuel cell will preferably include establishing connections for delivering a hydrogen-rich reformate to the fuel cell and for returning a fuel cell exhaust stream to the enclosure. Optionally, but preferably, the method will include the additional step of providing the enclosure with a communication link for communicating with a remote process control unit.

BRIEF DESCRIPTION OF THE DRAWING

The invention may be understood by reference to the following description taken in conjunction with the accompanying drawing.

FIG. 1 is a schematic representation a portable fuel processor apparatus and enclosure of the present invention.

While the invention is susceptible to various modifications and alternative forms, a specific embodiment thereof has been shown by way of example in the drawing and is herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE PREFERRED EMBODIMENTS

Illustrative embodiments of the invention are described below. In the interest of clarity, not all features of an actual embodiment are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover it will be appreciated that such a development effort might be complex and time-consuming, but would nevertheless be a routing undertaking for those of ordinary skill in the art having the benefit of this disclosure.

The present invention provides (1) a portable fuel processing apparatus and (2) a method of installing a portable fuel processor.

(1) A Portable Fuel Processing Apparatus

The portable fuel processing apparatus of the present invention includes an enclosure having an outer wall that defines an interior space and provides a gas impermeable barrier. Attached to the enclosure is means for porting the enclosure between locations. In addition, the apparatus includes a fuel reformer located within the enclosure for converting a reformer fuel to a hydrogen-rich reformate gas.

Portable Enclosure

Suitable enclosures for use in the methods and apparatus of the present invention may be any enclosure that is of a size, material and construction that will house the fuel processor and its associated subsystems. The outer wall of such an enclosure should provide a gas impermeable barrier that will prevent gases generated by the reformer or that leak from an enclosed subsystem from escaping to the external environment. Because one of the primary features of the fuel processing apparatus is the portable nature of the system, it is preferred that the enclosure and the enclosed fuel processor and subsystems be small so as to facilitate transport. However, the enclosed fuel processor should be sufficiently large such that when coupled to a fuel cell stack, the combined power generation system has a power generation capacity of at least about 1 kW, preferably at least about 3 kW, and more preferably at least about 7.5 kW Preferred enclosures are rigid framed housings having panels secured to the frame. The panels may be manufactured of a variety of materials such as metals, plastics and composites with or without thermal insulation. Optionally, the panels may be removable for ease of access to the enclosure contents when the fuel processor is not in operation. Regardless of the materials or method of construction, the fully assembled enclosure should provide a gas impermeable barrier. As referred to herein, "gas impermeable barrier" refers to a barrier that will substantially inhibit the passage of gases from the interior of the enclosure to the external environment. The venting of gases from the interior of the enclosure is provided and controlled by an integrated cooling system comprising a plurality of heat exchanger discharge fans.

The enclosure has connectors or inlets for connecting with sources of water and fuel and for drawing air into the enclosure for use in the fuel processing operation. Preferably, the reformer fuel will be natural gas because of its cost and ready availability in most residential and commercial buildings. The reformer fuel and water connectors are preferably conventional and standard connections for utilities that are typically available in residential and commercial buildings. Additional connectors, inlets and/or outlets on the enclosure can include a drain connector for connecting a water collection vessel with a domestic drain and a connector to an external power source.

The enclosure connectors, inlets and outlets used in the fuel processing apparatus of the present invention are preferably "quick-connect" in nature to further simplify the installation and set-up of the portable fuel processor apparatus. Such connectors can include plug and socket-type connectors, connectors having interlocking male and female features, connectors having engaging tongue and groove features, as well as connectors having complementary threaded surfaces. It should be noted that this brief description of the types of connectors that are suitable for use on the portable enclosure is not meant be exhaustive but is merely illustrative of the different connectors that can provide secure connections that can be quickly engaged or disengaged.

Optionally, the enclosure has at least one connector for connecting with a fuel cell stack. Preferably, fuel cell stack connectors can provide for the delivery of a hydrogen-rich reformate and/or air, the return of the anode and cathode exhaust streams to the enclosure, and the delivery and return of a cooling medium to the fuel cell. Any connections with the fuel cell stack are preferably conventional and standard in nature so as to simplify the use of the fuel processor and its enclosure with any fuel cell stack.

The fuel processor requires a source of air for a plurality of operations. Where the enclosure houses an air handling system, it is envisioned that the enclosure can have a connector for delivering an air stream to the fuel cell stack. The air inlet may be connected to an external air handling system but is preferably a source of air that is directed into an air handling system housed within the enclosure. In a preferred embodiment, the air inlet is merely an air intake for an internal air handling system. A preferred internal air handling system capable of providing a stable air source to a plurality of functions is described in detail in U.S. Ser. No. 10/407,258 by Nguyen, et al., filed concurrently herewith, now U.S. Pat. No. 6,796,332, the description of which is incorporated herein by reference.

The enclosure preferably comprises a cooling system for use in the fuel processing operations and for continuously venting gases from within enclosure. Such a cooling system is described in more detail in U.S. Ser. No. 10/407,401 by Wheat, et al., filed concurrently herewith, now abandoned, the description of which is incorporated herein by reference. Such a cooling system typically includes a circulating cooling medium, such as water or the like. Therefore, the enclosure preferably has a fill port for filling a coolant tank. In addition, the enclosure can have connectors for delivering and returning the cooling medium to the fuel cell stack to aid in regulating the temperature within the stack.

During the operation of the fuel processor, the interior of the portable enclosure is continuously vented by a ventilator. The ventilator is preferably a heat exchanger discharge fan that is associated with an internal coolant system. Such a coolant system and its use in ventilating a fuel processor enclosure are described in greater detail in U.S. Ser. No. 10/407,401 by Wheat, et al., filed concurrently herewith, now abandoned, which is referred to immediately above. In the alternative, the ventilator may be a fan configured to draw gases out of the enclosure and vent them outside the enclosure. When combustible gases are not accumulating within the portable enclosure, such a venting operation is a safe and effective manner in which to remove gases from the enclosure. However, in the event combustible gases are so detected, the ventilator should have the capability to re-direct the combustible gases to a combustor within the enclosure for combustion before venting can occur.

Because of the possibility that combustible gases might begin to accumulate, it is highly preferred that the portable enclosure have a gas detection system for monitoring the interior of the enclosure for the presence of such gases. Such a detection system has at least one gas sensor for monitoring the environment within the enclosure and communicating data to a processor or process controller. The sensor should be selected to monitor the environment within the enclosure for the presence of hydrogen, methane, carbon monoxide, and other combustible/hazardous gases that may accumulate within the enclosure. The sensor is preferably a lower explosive threshold limit-type sensor. The sensor should be selected based upon a number of factors including the nature and associated hazards of the gases that may be present within the enclosure, as well as applicable codes and standards for the locale where the fuel processor is to be installed and operated. Suitable sensors are commercially available from a multitude of vendors and are typically sold as carbon monoxide, natural gas and hydrogen sensors. Further, separate sensors for each gas are not required. For instance, due to the nature of carbon monoxide and natural gas, a gas detection sensor designed to detect natural gas or carbon monoxide will also be triggered by the presence of hydrogen at levels $1/10^{th}$ the lower explosive limit of the sensor.

The sensor should be capable of communicating data to a process controller that can receive data and determine when a gas is present and if any action is needed. It is envisioned that the process controller is also used to control the operation of the fuel processor and its subsystems and may be an on-board processor, a remote processor, or system of both on-board and remote processors. Depending on the data received from the sensor, the process controller can activate an alarm to alert an operator, begin a shut-down sequence for the fuel processor, and/or initiate a routine such as activating an evacuator to remove the gases from the interior of the enclosure among other possible routines.

Additional connectors will include communication connectors as it is desired that a communications link be established between the enclosure and a remote process control unit. In addition, it is preferred that an on-board process controller be provided within the enclosure for locally controlling the operation of the fuel processor as well as the other on-board subsystems such as air handling, cooling, and water management subsystems. Communications connectors between the on-board process control unit and a remote process control unit are beneficial to provide remote monitoring and control of the portable fuel processing apparatus.

Additional preferred features of the enclosure include a liquid crystalline display or other video display for displaying data concerning the operational state and potential diagnostic information concerning the fuel processor. The video display is linked with the on-board process control unit and can optionally be linked with a remote process control unit when desired. The enclosure can also comprise one or more user controls for providing user selected inputs to the on-board process control unit. Knobs, buttons, dials, keyboards, and the like are suitable types of user controls for indicating a desired operation state to the process control unit.

Porting Means

Affixed to the enclosure is porting means for use in transporting the portable fuel processing apparatus between locations. Porting means can include wheels, rollers, tracks and the like that are affixed to a bottom surface of the enclosure and that will facilitate moving the enclosure. Further, porting means can also include handles, grips, eye hooks and the like that are affixed to one or more of the side surfaces or top wall of the enclosure. The enclosure also has a rigid bottom wall or base support that allows for lift and transportation via a fork lift mechanism.

Fuel Reformer

Two different reactions are typically carried out in the reforming process. Formulas I and II are exemplary reaction formulas wherein methane is considered as the hydrocarbon:

$$CH_4 + \tfrac{1}{2}O_2 \Rightarrow 2H_2 + CO \quad (I)$$

$$CH_4 + H_2O \Rightarrow 3H_2 + CO \quad (II)$$

The partial oxidation reaction (formula I) occurs very quickly to the complete conversion of oxygen added and is exothermic (i.e., produces heat). A higher concentration of oxygen in the feed stream favors the partial oxidation reaction.

The steam reforming reaction (formula II), occurs slower and is endothermic (i.e., consumes heat). A higher concentration of water vapor favors steam reforming.

One of skill in the art should understand and appreciate that partial oxidation and steam reforming may be combined to convert pre-heated reformer reactants into a synthesis gas containing hydrogen and carbon monoxide. In such instances, the ratios of oxygen to hydrocarbon and water to hydrocarbon become characterizing parameters. These ratios affect the operating temperature and hydrogen yield. The operating temperature of the reforming step can range from about 550° C. to about 900° C., depending on the feed conditions and the catalyst.

The reformer uses a catalyst bed that may be in any form including pellets, spheres, extrudate, monoliths, and the like or wash coated onto the surface of fins or heat pipes. Partial oxidation catalysts should be well known to those with skill in the art and are often comprised of noble metals such as platinum, palladium, rhodium, and/or ruthenium on an alumina wash coat on a monolith, extrudate, pellet or other support. Non-noble metals such as nickel or cobalt have been used. Other wash coats such as titania, zirconia, silica, and magnesia have been cited in the literature. Many additional materials such as lanthanum, cerium, and potassium have been cited in the literature as "promoters" that improve the performance of the partial oxidation catalyst. Steam reforming catalysts should be known to those with skill in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium.

When the reforming process is primarily an autothermal reforming process, a cooling step is used to cool the reformate stream to a temperature of from about 600° C. to about 200° C., preferably from about 500° C. to about 300° C., and more preferably from about 425° C. to about 375° C., in preparation for various clean-up processes. This cooling may be achieved with heat sinks, heat pipes or heat exchangers depending upon the design specifications and the need to recover/recycle the heat content of the gas stream. Alternatively, or in addition thereto, cooling may be accomplished by injecting additional feed components such as fuel, air or water. Water is preferred because of its ability to absorb a large amount of heat as it is vaporized to steam. The amounts of added components depend upon the degree of cooling desired and are readily determined by those with skill in the art. When the reforming process is intended to be primarily a steam reforming process, cooling of the synthesis gas is optional because of the endothermic nature of the steam reforming process.

A common impurity in the raw reformate stream is sulfur, which is converted by the reforming process to hydrogen sulfide. The reformer or a module downstream from the reformer can preferably include zinc oxide and/or other materials capable of absorbing and converting hydrogen sulfide, and may include a support (e.g., monolith, extrudate, pellet etc.). Desulphurization is accomplished by converting the hydrogen sulfide to water in accordance with the following reaction formula III:

$$H_2S + ZnO \rightarrow H_2O + ZnS \quad \text{(III)}$$

Zinc oxide is preferred as it is an effective hydrogen sulfide absorbent over a wide range of temperatures from about 25° C. to about 700° C. and affords great flexibility for optimizing the sequence of processing steps by appropriate selection of operating temperature. Other impurities such as chlorides can also be removed.

The purified reformate stream may then be sent to an optional mixing step in which water is added to the gas stream. The addition of water lowers the temperature of the reactant stream as it vaporizes and supplies more water for the water gas shift reaction. The water vapor and other reformate stream components can be mixed by being passed through a processing core of inert materials such as ceramic beads or other similar materials that effectively mix and/or assist in the vaporization of the water. A typical water gas shift reaction converts carbon monoxide to carbon dioxide in accordance with formula IV:

$$H_2O + CO \rightarrow H_2 + CO_2 \quad \text{(IV)}$$

In this is process step, carbon monoxide, a poison to fuel cells, is substantially removed from the gas stream and is converted into carbon dioxide, which is generally considered an inert gas in fuel cells. The concentration of carbon monoxide should preferably be lowered to a level that can be tolerated by fuel cells, typically below about 50 ppm. Generally, the water gas shift reaction can take place at temperatures of from 150° C. to 600° C. depending on the catalyst used. Under such conditions, most of the carbon monoxide in the gas stream is oxidized to carbon dioxide.

Low temperature shift catalysts operate at a range of from about 150° C. to about 300° C. and include for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like. High temperature shift catalysts are preferably operated at temperatures ranging from about 300° to about 600° C. and can include transition metal oxides such as ferric oxide or chromic oxide, and optionally including a promoter such as copper or iron silicide. Other suitable high temperature shift catalysts are supported noble metals such as supported platinum, palladium and/or other platinum group members. The shift catalyst can also include a packed bed of high temperature or low temperature shift catalyst such as described above, or a combination of both high temperature and low temperature shift catalysts. Optionally, an element such as a heat pipe may be disposed in the processing core of the shift reactor to control the reaction temperature within the packed bed of catalyst as lower temperatures are favorable to the conversion of carbon monoxide to carbon dioxide.

In addition, selective oxidation can optionally be performed on the hydrogen-rich reformate to convert remaining carbon monoxide to carbon dioxide. Such reactions include: the desired oxidation of carbon monoxide (formula V) and the undesired oxidation of hydrogen (formula VI) as follows:

$$CO + \tfrac{1}{2}O_2 \rightarrow CO_2 \quad \text{(V)}$$

$$H_2 + \tfrac{1}{2}O_2 \rightarrow H_2O \quad \text{(VI)}$$

The processing is carried out in the presence of a catalyst for the oxidation of carbon monoxide and may be in any suitable form, such as pellets, spheres, monolith, etc. Oxidation catalysts for carbon monoxide are known and typically include noble metals (e.g., platinum, palladium) and/or transition metals (e.g., iron, chromium, manganese), and/or compounds of noble or transition metals, particularly oxides. A preferred oxidation catalyst is platinum on an alumina wash coat. The wash coat may be applied to a monolith, extrudate, pellet or other support. Additional materials such as cerium or lanthanum may be added to improve performance. Many other formulations have been cited in the literature with some practitioners claiming superior performance from rhodium on alumina catalysts. Ruthenium, palladium, gold, and other materials have been cited in the literature as being active for this use as well.

The preferential oxidation of carbon monoxide is favored by low temperatures. Because both reactions produce heat, a heat pipe or other means can be disposed within the reactor to remove heat generated in the process. The operating temperature of process is preferably kept in the range of from about 90° C. to about 150° C. Again, such an oxidation process can be utilized to reduce the carbon monoxide level to less than 50 ppm, a level that is suitable for use in fuel cells.

The hydrogen-rich reformate exiting the fuel processor is a hydrogen rich gas containing carbon dioxide and other constituents such as water, inert components (e.g., nitrogen, argon), residual hydrocarbon, etc. This reformate can be used as the feed for a fuel cell or for other applications where a hydrogen-rich feed stream is desired. Optionally, the hydrogen-rich reformate may be sent on to further processing, for example, to remove carbon dioxide, water or other components. The separation of water from the reformate stream before passage to the fuel cell stack is addressed below.

Fuel reformers or processors are well known in the art for use in reforming or converting a hydrocarbon-based stream to a hydrogen-rich gas stream. Such reformers include but are not limited to those described in U.S. Patent Application Publication Nos.: US 2002/0083646 A1 to Deshpande, et al., published Jul. 4, 2002; US 2002/0090326 A1 to Deshpande, published Jul. 11, 2002; US 2002/0090328 A1 to Deshpande, published Jul. 11, 2002; US 2002/0090327 A1 to Deshpande, published Jul. 11, 2002; US 2002/0088740 A1 to Krause, et al., published Jul. 11, 2002; US 2002/0094310 A1, to Krause, et al., published Jul. 18, 2002; US 2002/0155329 A1 to Stevens, published Oct. 24, 2002; US 2003/00211741 A1 to Childress, et al., published Jan. 30, 2003; and US 2003/0021742 to Krause, et al., published Jan. 30, 2003; the disclosure of each of which is incorporated herein by reference. These publications disclose a number of differently configured fuel processors that may be used to advantage within the integrated apparatus of the present invention.

Fuel processors and reformers typically have an associated combustor that is either separate from or integrated with the reforming reactor and that is used to heat reactants, generate steam, heat reactors, and dispose of undesirable by-products that are generated during the operation of the fuel processor and/or fuel cell. For instance, such combustors are frequently referred to as anode tail gas oxidizers since they are commonly used to combust tail gas from the anode of the fuel cell stack in addition to their role in the fuel processing operation.

In the methods and portable apparatus of the present invention it is preferred that a combustor be present not only to aid in the fuel processing operation, but also for use in combusting and thereby eliminating combustible gases that are separated from various fuel processing and fuel cell process streams. After combustion, the combustion product gases can typically be vented safely from the enclosure. Preferably, the combustor will have an exhaust line that passes out of an upper portion of the enclosure so as to prevent low lying hot areas.

Suitable combustors can include those disclosed in U.S. Pat. No. 6,077,620, issued Jun. 20, 2000 to Pettit (catalytic combustor fired by anode effluent and/or fuel from a liquid fuel supply that has been vaporized); U.S. Pat. No. 6,232,005, issued May 15, 2001 to Pettit (a tubular section at the combustor's input end intimately mixes the anode and cathode effluents before they contact the combustors primary catalyst bed; the tubular section comprises at least one porous bed of mixing media that provides a tortuous path for creating turbulent flow and intimate mixing of the anode and cathode effluents therein); and U.S. Pat. No. 6,342,197, issued Jan. 29, 2002 to Senetar, et al. (describing and comparing combustors with a variety of features and configurations), the disclosures of which are incorporated herein by reference. Other suitable combustors include those described in U.S. Ser. No. 10/408,080 by Nguyen, filed concurrently herewith, now U.S. Pat. No. 7,235,217 and in U.S. Ser. No. 10/407,290 by Deshpande, et al., filed concurrently herewith, now U.S. Pat. No. 7,101,175 the disclosures of which are incorporated herein by reference.

Preferably, the fuel processor will have one or more subsystems that are integrated with the fuel processor, the fuel cell or a combination of both and which are housed within the portable enclosure. As noted above, air handling, cooling and water management subsystems are commonly integrated and can be included within the portable enclosure.

For instance, methods and devices for managing water within an integrated fuel process and fuel cell operation are disclosed in U.S. Ser. No. 10/407,617 by Desphande, et al., filed concurrently herewith, now abandoned, and U.S. Ser. No. 10/407,876 by Wheat, et al., filed concurrently herewith, U.S. Pat. No. 7,829,227, and U.S. Ser. No. 10/408,006 by Wheat, et al., filed concurrently herewith, now U.S. Pat. No. 7,028,700 the disclosure of each of which is incorporated herein by reference.

Fuel Cell Stack

As described herein, the fuel processing apparatus can have one or more connectors for interconnecting the enclosure and enclosed fuel processor with an external fuel cell or fuel cell stack. Specifically, the portable enclosure can have connectors for receiving anode exhaust and cathode exhaust from the fuel cell or from the anode and cathode manifolds of a fuel cell stack. Further, the enclosure can have a connector or outlet for delivering the hydrogen-rich reformate to the stack. In addition, connections for providing a cooling medium to the fuel cell or a source of purified air can also be provided.

Fuel cells and fuel cell types are well known in the art and those skilled in the art should be able to select appropriate connectors for interconnecting a fuel cell with the portable fuel processing apparatus and enclosure.

(2) A Method of Installing a Portable Fuel Processor

The present invention further provides a method of installing a portable fuel processor apparatus. The method includes the steps of moving a portable gas impermeable enclosure that houses a fuel processor to a desired location, connecting a source of water to the enclosure, connecting a source of feedstock fuel to the enclosure, and connecting a fuel cell to the enclosure. Preferably, the steps of connecting the enclosure to a source of water and to a source of reformer fuel include connecting the enclosure to water and natural gas utility lines within a building. The method can further include the step of connecting the enclosure to or providing a domestic drain for the enclosure.

The step of connecting the enclosure to a fuel cell will preferably include establishing connections for delivering a hydrogen-rich reformate to the fuel cell and for returning a fuel cell exhaust stream to the enclosure. Optionally, but preferably, the method will include the additional step of providing the enclosure with a communication link for communicating with a remote process control unit. Further, all of the connecting steps will preferably include the use of quick-connect-type connectors.

DETAILED DESCRIPTION OF THE FIGURE

FIG. 1 is a schematic diagram of the portable fuel processing apparatus and enclosure of the present invention. The portable apparatus and enclosure is shown generally by reference number 110. The portable apparatus and enclosure has combustor/reformer 115 that is housed within outer wall 105. Outer wall 105 encloses a number of fuel processor subsystems including the combustor/reformer, clean-up/shift module 145, gas/liquids separators 120 and 146, collection vessel 140, on-board process control unit 100, gas detector/sensor 180, process water tank 165 and evacuator 160. Also within outer wall 105 is interior 155 which constitutes the open volume or open space within the portable enclosure.

Outer wall 105 provides a gas impermeable barrier that prevents gases that diffuse into interior 155 from flowing out of the enclosure. Outer wall 105 has a number of connectors or inlets/outlets for connecting the reformer and other fuel processing subsystems with various external elements. Connector 124 is provided on outer wall 105 for connecting the combustor/reformer with external hydrocarbon-based fuel source 104. Connector 122 is provided for connecting the reformer or internal process water tank 165 with external process water source 102. Although not specifically illustrated, those skilled in the art should know that water is used at a number of stages during the fuel reforming process and that appropriate piping and control valving can be provided as needed to deliver water from tank 165 to the various fuel processing subsystems.

During the operation of the fuel processor, combustor/reformer 115 receives water and a hydrocarbon-based fuel from external sources and converts the fuel into a hydrogen-rich reformate. The hydrogen-rich reformate is directed through line 108 to one or more clean-up and/or purification processes that are illustrated collectively as clean-up/shift module 145. The purified shifted reformate is then directed through line 156 into gas/liquids separator 120 for separating and removing at least a portion of the water that is present in the reformate gas stream. Preferably, the reformate will be cooled so as to condense the water from the reformate before being separated from the reformate gas stream.

If the water-depleted reformate is of fuel cell quality, the reformate gas is directed through line 112 and out connector 128 to fuel cell stack 130 where it will be at least partially consumed by the fuel cell(s) during the electrochemical reaction. If the water-depleted reformate is not of fuel cell quality, the reformate gas is directed through line 114 to the combustor portion of combustor/reformer 115 for combustion. The combustion product gases can then be directed through line 116, out of the enclosure through connector 134. Preferably, an exhaust vent or line 135 is connected to connector 134 for directing the combustion product gases out of the fuel processor enclosure and out of the building where the fuel processor is being operated.

Water that is separated from the hydrogen-rich reformate stream in gas/liquids separator 120 is directed through line 118 into collection vessel 140. The separated water will commonly contain entrained or dissolved combustible gas components that can evaporate from the water while in collection vessel 140. This water cannot be safely released to the environment without reducing the level of such gases. After separation in one or more separators as are known in the art, residual gases are removed from the water stream passively using vessel 140. As illustrated, collection vessel 140 is an open vessel that enables these gases to vaporize and diffuse into interior space 155 within enclosure 110. After the collected water has had sufficient time to be passively degassed in collection vessel 140, the water is directed through vessel outlet 132 and through line 126. Water may be held in collection vessel 140 for periodic draining or a restriction may be used in vessel outlet 132 or within connector 136 to maintain a gradual flow of water out of the vessel that will cause the water to pool in open vessel 140 for a desired length of time. Line 126 passes through outer wall 105 at connector 136. Connector 136 is connected with domestic drain 150 for safely disposing of the degassed water.

Fuel cell stack 130 consumes hydrogen-rich reformate and an oxygen-containing gas during the electrochemical reaction that produces electricity. Spent reformate, unreacted hydrogen and spent oxygen-containing gas, unreacted oxygen, and product water in liquid and vapor phases are present in the fuel cell exhaust gas streams. As illustrated, the anode exhaust gas stream is directed through connector 138 and line 142 into separator 146. Within separator 146, liquid water is separated from the gas components and directed through line 144 to collection vessel 140. The gases that are separated from the anode exhaust gas stream are directed through line 106 to the combustor portion of combustor/reformer 115 for combustion. The cathode exhaust stream 172 is directed into the enclosure through connector 174 and to process water tank 165 where liquid water and water vapor in the gas stream condense and drop out of the stream. Cathode exhaust gases accumulating above the water in process water tank 165 can be directed to combustor/reformer 115 for disposal through combustion. The water level within process water tank 165 is controlled with by adding water from source 102 and withdrawing water through outlet 94. Water that is withdrawn from outlet 94 is routed through line 148 to open collection vessel 140. The separated water deposited in collection vessel 140 will commonly contain entrained or dissolved combustible gas components from the cathode exhaust stream.

Combustible gases that evaporate from the collected water diffuse out of the open collection vessel into the interior 155 of enclosure 110. There the gases can be detected by gas sensor 180 which communicates the data to processor means such as remote processor control unit 175 and/or on-board process control unit 100. The processor means monitors the data received from sensor 180 and determines when combustible gases are present in enclosure 110. As a response to the detection of such gases, the processor means can activate an alarm or initiate one or more routines such as initiating a shut-down routine for the fuel processor or to activate evacuator 160 so as to remove the gases from the enclosure. When activated, evacuator 160 withdraws the combustible gases from the interior of the enclosure and directs them via line 176 to the combustor of combustor/reformer 115. In the alternative, in an embodiment not illustrated in FIG. 1, the combustible gases may be directed out of enclosure 115 for storage or handling in an external process module.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A portable fuel processing apparatus, the apparatus comprising:
    an enclosure having an outer wall defining an interior space and providing a gas impermeable barrier that substantially inhibits the passage of gases from the interior space of the enclosure to the external environment;
    porting means attached to the enclosure wherein said porting means are selected from (1) wheels, rollers, and tracks affixed to a bottom surface of the enclosure and (2) handles, grips, eye hooks affixed to one or more of the side surfaces or top wall of the enclosure;
    a fuel reformer disposed within the interior space of the enclosure for converting a reformer fuel to a hydrogen-rich reformate gas; and
    a gas detector, the gas detector comprising a sensor within the interior space of the enclosure to monitor the environment within the enclosure for the presence of a combustible gas in the interior space of the enclosure.

2. The apparatus of claim 1, wherein the sensor can detect the presence of hydrogen.

3. The apparatus of claim 1, wherein the sensor can detect the presence of methane.

4. The apparatus of claim 1, wherein the sensor can detect the presence of carbon monoxide.

5. The apparatus of claim 1, which further comprises a plurality of heat exchanger discharge fans for venting of gases from the interior of the enclosure.

6. The apparatus of claim 1, wherein the enclosure further comprises a connector for connecting the enclosure and the fuel reformer with a source of a feedstock or reformer fuel, the source of reformer fuel comprising a natural gas utility line within a building.

7. The apparatus of claim 1, wherein the enclosure further comprises a connector for connecting the enclosure and the fuel reformer with a source of water; the source of water comprising a water utility line within a building.

8. The apparatus of claim 1, wherein the enclosure further comprises a connector for connecting the enclosure with an external drain within a building.

9. The apparatus of claim 1, wherein the enclosure further comprises a connector for connecting the enclosure and the fuel reformer with a fuel cell for use in delivering hydrogen-rich reformate gas to the fuel cell.

10. The apparatus of claim 9, wherein the enclosure further comprises a connector for connecting the fuel cell with the enclosure, for use in returning a fuel cell exhaust gas to the enclosure.

11. The apparatus of claim 1, further comprising an on-board process control unit wherein the enclosure further comprise a connector for establishing electronic communication with a remote process control unit.

12. The apparatus of claim 1, wherein the fuel reformer is capable delivering hydrogen-rich reformate to a fuel cell stack in quantities sufficient to generate at least about 1 kW of electricity.

13. The apparatus of claim 12, wherein the fuel reformer is capable delivering hydrogen-rich reformate to a fuel cell stack in quantities sufficient to generate at least about 3 kW of electricity.

14. The apparatus of claim 1, wherein the fuel reformer is capable delivering hydrogen-rich reform ate to a fuel cell stack in quantities sufficient to generate at least about 7.5 kW of electricity.

15. A method of installing a fuel processor, the method comprising the steps of:
moving a gas impermeable enclosure to a desired location, the enclosure housing a fuel processor and a gas detector, the gas detector comprising a sensor within the interior space of the enclosure to monitor the environment within the enclosure for the presence of a combustible gas in the interior space of the enclosure and wherein the enclosure has a porting means attached wherein said porting means are selected from (1) wheels, rollers, and tracks affixed to a bottom surface of the enclosure and (2) handles, grips, eye hooks affixed to one or more of the side surfaces or top wall of the enclosure;
connecting a source of water to the enclosure;
connecting a source of reformer fuel to the enclosure;
connecting a fuel cell to the enclosure; and
connecting the enclosure to a domestic drain.

16. The method of claim 15, wherein the step of connecting the enclosure to a source of water comprises connecting the enclosure to a water utility line within a building.

17. The method of claim 15, wherein the step of connecting the enclosure to a source of reformer fuel comprises connecting the enclosure to a natural gas utility line within a building.

18. The method of claim 15, wherein the step of connecting a fuel cell to the enclosure comprises connecting a line between the fuel cell and enclosure for delivering a hydrogen-rich reformate to the fuel cell.

19. The method of claim 15, wherein the step of connecting a fuel cell to the enclosure comprises connecting a line between the fuel cell and enclosure for returning a fuel cell exhaust gas to the enclosure.

20. A method of installing a fuel processor, the method comprising the steps of:
moving a gas impermeable enclosure to a desired location, the enclosure housing a fuel processor and a gas detector, the gas detector comprising a sensor within the interior space of the enclosure to monitor the environment within the enclosure for the presence of a combustible gas in the interior space of the enclosure and wherein the enclosure has a porting means attached wherein said porting means are selected from (1) wheels, rollers, and tracks affixed to a bottom surface of the enclosure and (2) handles, grips, eye hooks affixed to one or more of the side surfaces or top wall of the enclosure;
connecting a source of water to the enclosure;
connecting a source of reformer fuel to the enclosure;
connecting a fuel cell to the enclosure; and
providing the enclosure with a communication link with a remote process control unit.

21. A portable fuel processing apparatus, the apparatus comprising:
an enclosure having an outer wall defining an interior space and providing a gas impermeable barrier that substantially inhibits the passage of gases from the interior space of the enclosure to the external environment;
porting means attached to the enclosure wherein said porting means are selected from (1) wheels, rollers, and tracks affixed to a bottom surface of the enclosure and (2) handles, grips, eye hooks affixed to one or more of the side surfaces or top wall of the enclosure;
a fuel reformer disposed within the interior space of the enclosure for converting a reformer fuel to a hydrogen-rich reformate gas; and
a water collection vessel disposed within the enclosure for collecting and degassing water from the fuel reformer for disposal in a domestic drain.

22. A portable fuel processing apparatus, the apparatus comprising:
an enclosure having an outer wall defining an interior space and providing a gas impermeable barrier that substantially inhibits the passage of gases from the interior space of the enclosure to the external environment;
porting means attached to the enclosure wherein said porting means are selected from (1) wheels, rollers, and tracks affixed to a bottom surface of the enclosure and (2) handles, grips, eye hooks affixed to one or more of the side surfaces or top wall of the enclosure;
a fuel reformer disposed within the interior space of the enclosure for converting a reformer fuel to a hydrogen-rich reformate gas; and
wherein the enclosure comprises a connector for establishing electronic communication with a remote process control unit.

\* \* \* \* \*